(12) United States Patent
Quercia

(10) Patent No.: US 11,542,198 B2
(45) Date of Patent: Jan. 3, 2023

(54) COMPOSITE ARCHITECTURAL ULTRA-HIGH PERFORMANCE PORCELAIN CONCRETE (CA-UHPPC) PANELS AND METHOD OF PRODUCING THE SAME

(71) Applicant: TAKTL LLC, Turtle Creek, PA (US)

(72) Inventor: George Quercia, Cheswick, PA (US)

(73) Assignee: TAKTL LLC, Turtle Creek, PA (US)

( * ) Notice: Subject to any disclaimer, the term of this patent is extended or adjusted under 35 U.S.C. 154(b) by 370 days.

(21) Appl. No.: 16/565,544

(22) Filed: Sep. 10, 2019

(65) Prior Publication Data
US 2021/0070658 A1    Mar. 11, 2021

(51) Int. Cl.
| | |
|---|---|
| C04B 18/16 | (2006.01) |
| C04B 28/02 | (2006.01) |
| C04B 14/04 | (2006.01) |
| C04B 14/48 | (2006.01) |
| C04B 14/42 | (2006.01) |
| B28B 23/02 | (2006.01) |
| C04B 40/02 | (2006.01) |
| C04B 41/49 | (2006.01) |
| B28B 7/34 | (2006.01) |
| B28B 11/24 | (2006.01) |
| B28B 11/04 | (2006.01) |

(52) U.S. Cl.
CPC ............ *C04B 18/167* (2013.01); *B28B 7/348* (2013.01); *B28B 11/04* (2013.01); *B28B 11/247* (2013.01); *B28B 23/02* (2013.01); *C04B 14/045* (2013.01); *C04B 14/42* (2013.01); *C04B 14/48* (2013.01); *C04B 28/02* (2013.01); *C04B 40/0281* (2013.01); *C04B 41/4955* (2013.01)

(58) Field of Classification Search
CPC ................................ C04B 18/167; B28B 1/16
See application file for complete search history.

(56) References Cited

U.S. PATENT DOCUMENTS

| | | | | |
|---|---|---|---|---|
| 6,162,511 A | * | 12/2000 | Garnett ................. | B05D 3/067 |
| | | | | 427/514 |
| 6,176,920 B1 | * | 1/2001 | Murphy ................. | B28B 1/093 |
| | | | | 106/711 |
| 2017/0015587 A1 | | 1/2017 | Paul | |
| 2019/0337850 A1 | * | 11/2019 | Ali ..................... | C04B 40/0032 |
| 2021/0189131 A1 | * | 6/2021 | Kirisawa ............. | C08F 230/085 |

FOREIGN PATENT DOCUMENTS

| | | | | | |
|---|---|---|---|---|---|
| CN | 101844897 A | | 9/2010 | | |
| CN | 101684671 B | * | 6/2012 | ............. | C04B 28/02 |
| CN | 103819154 A | | 5/2014 | | |
| CN | 108147838 A | * | 6/2018 | | |
| JP | 2002302877 A | * | 10/2002 | ............. | C04B 14/42 |

OTHER PUBLICATIONS

Bartosz et al., "Ultra-high strength concrete made with recycled aggregate from sanitary ceramic wastes—The method of production and the interfacial transition zone", Elsevier, Construction and Building Materials vol. 122, (2016) pp. 736-742.

* cited by examiner

*Primary Examiner* — Kelly M Gambetta
*Assistant Examiner* — Virak Nguon
(74) *Attorney, Agent, or Firm* — Bachman & LaPointe, P.C.

(57) ABSTRACT

Disclosed in the present invention is a building with integral thermal insulation and heat shielding, in the technical field of construction engineering. The problem to be solved is to provide a building with integral thermal insulation and heat shielding, and the solution employed is as follows: a building with integral thermal insulation and heat shielding, which at least uses one of an inorganic thermal insulation structural layer and an inorganic thermal insulation layer; the inorganic thermal insulation structural layer is formed of one of, or a combination of both of, inorganic, thermally-insulating, heat-shielding and load-bearing concrete and inorganic, thermally-insulating, load-bearing building blocks; the inorganic, thermally-insulating, heat-shielding and load-bearing concrete has the following components in weight proportions: concrete composite light aggregate blending material: cement:sand:stone:ceramsite:fly ash:water:concrete admixture=(6–225):(200-800):(300-700):(500-1600):(150-650):(10-600):(80-400):(0.1-200). The present invention can be widely applied to the technical field of construction.

21 Claims, 6 Drawing Sheets

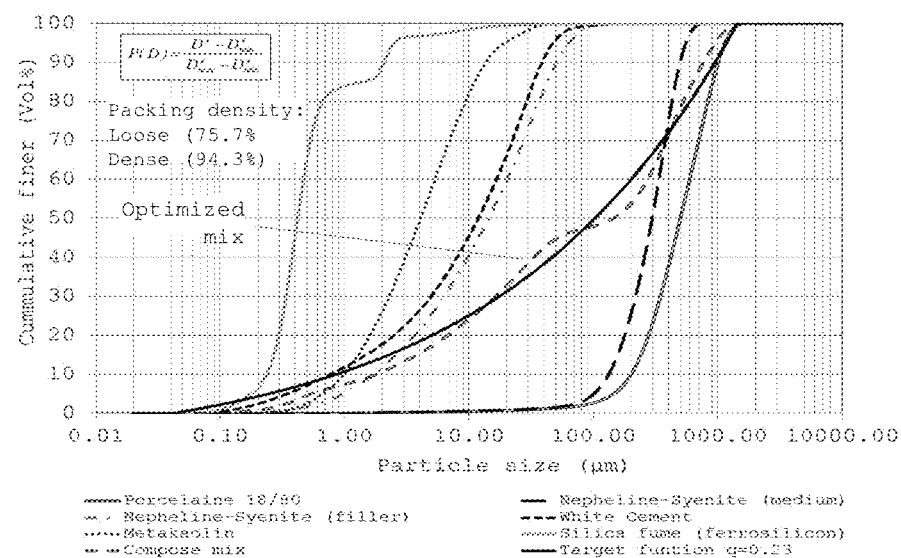
Figure 1: Average cumulative particle size distribution curves of main raw materials used to manufacture CA-UHPPC matrix in composite panels (UHPC+Fibers+Mesh)

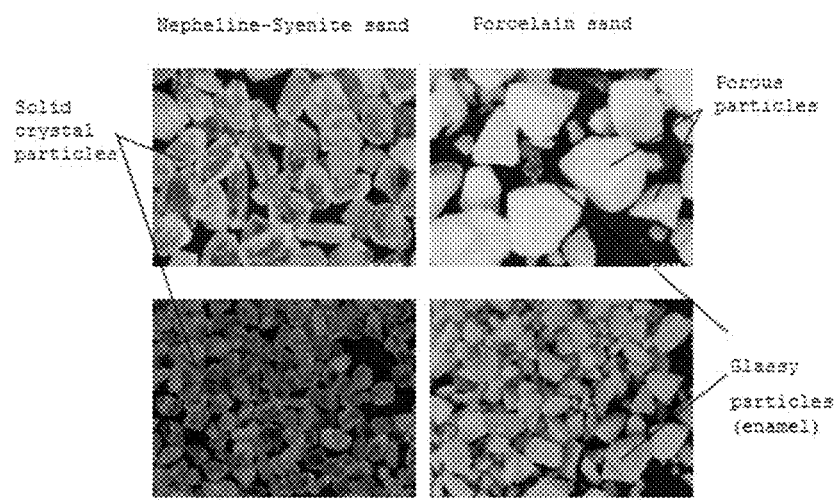
Figure 2: Optical photo-micrographs of Nepheline-Syenite and recycled porcelain sand particles.

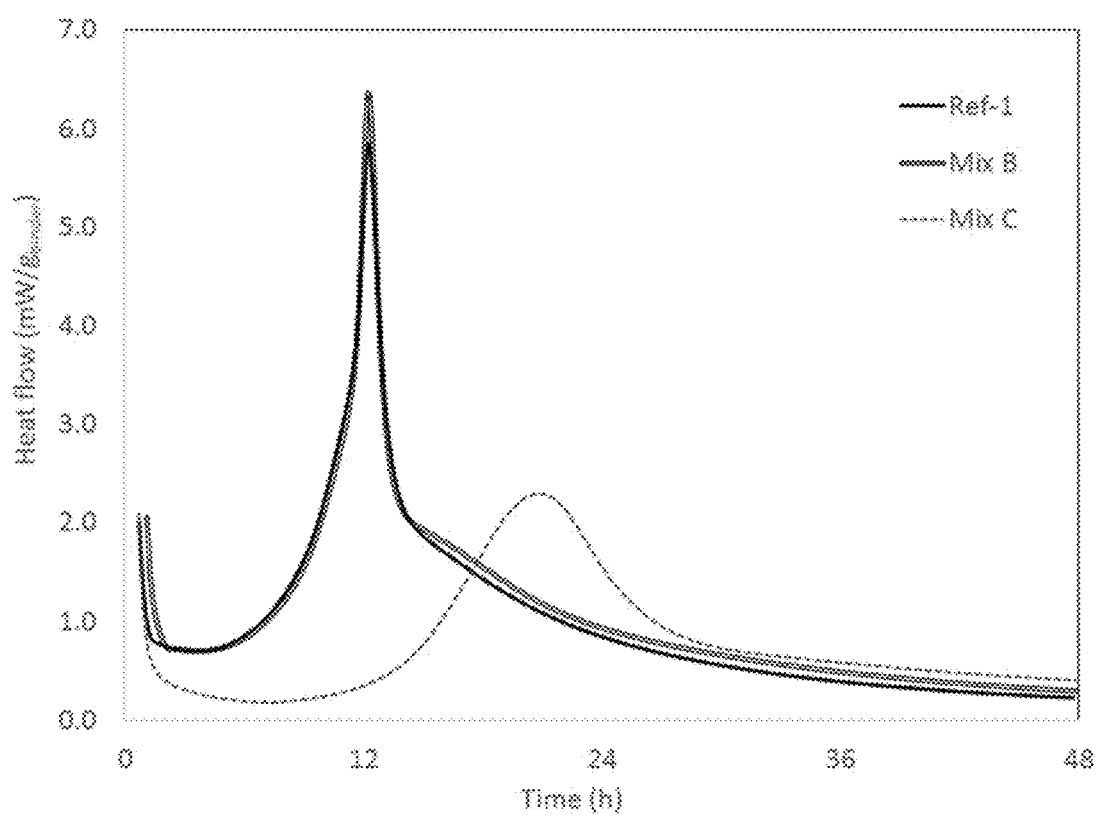
Figure 3: Heat flow of the different porcelain-based

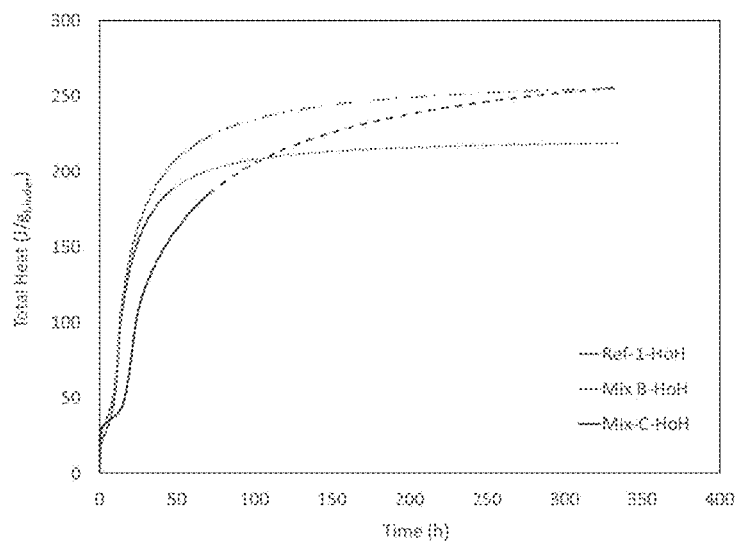
Figure 4: Accumulative total heat of the different porcelain based (Mix B and Mix C) and reference (Ref-1) UHPC

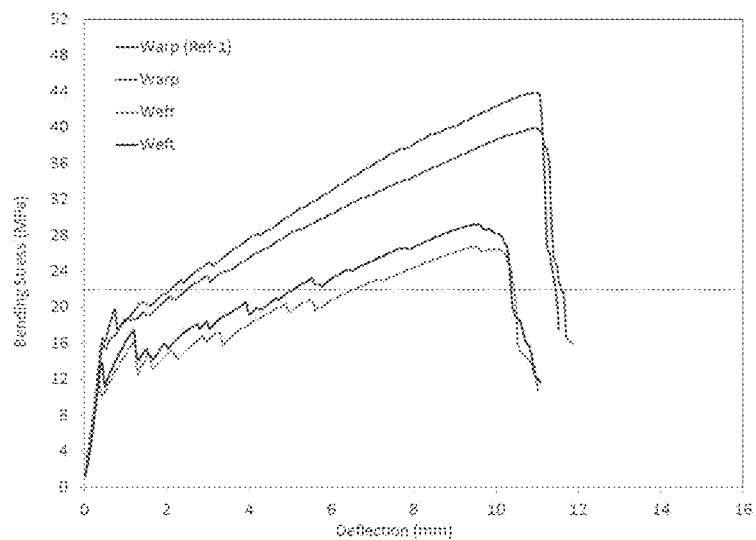
Figure 5: Three bending stress versus deflection of Ref-1 UHPC composite panels

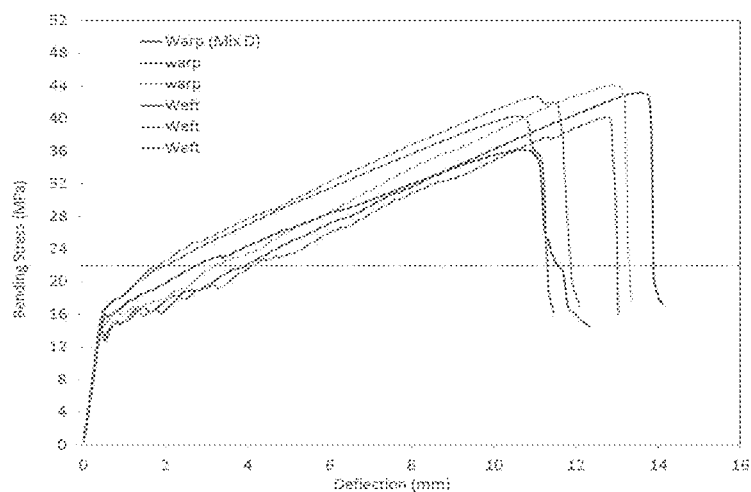
Figure 6: Three bending stress versus deflection of CA-UHPPC (Mix D) composite panel

COMPOSITE ARCHITECTURAL ULTRA-HIGH PERFORMANCE PORCELAIN CONCRETE (CA-UHPPC) PANELS AND METHOD OF PRODUCING THE SAME

TECHNICAL FIELD OF THE INVENTION

The technical field relates to composite ultra-high performance concrete containing recycled sanitary porcelain waste sand and lower cement content, which can be reinforced with a double layer of non-metallic grid. The disclosure also relates to a method for producing thin-walled composites CA-UHPPC facade panels and elements for building envelopes.

BACKGROUND

Among the different type of architectural panels used for interior and exterior cladding applications (i.e. tempered glass, terracotta, fiber-cement, stone, etc.) and other facade elements are those consisting of ultra-high performance concrete (UHPC) with discrete metallic and non-metallic fibers. Architectural UHPC facade and wall elements (i.e. fins, cast corners, decorative screens, etc.) are manufactured for architects and designers to create subtle or dramatic articulated facades that are easy to design, specify and install. The variety of standard/custom textures and colors add richness and character to cladding on existing or new construction and are an excellent material for high performance ventilated facades and prefabricated or unitized wall assemblies.

Architectural UHPC is a type of concrete that is characterized by its ductility (flexural strength of 12 to 18 MPa), durability (low water absorption and high freeze-thaw resistance) and compressive strength in the range of 100 to 150 MPa (14,500 to 22,000 psi). UHPC composition is typically characterized by high cement content (700 to 1200 kg/m$^3$, high content) of pozzolanic material such as silica fume (5 to 34% wt. based on cement content), the addition of silica powder as filler and the use of one or a combination of two silica sands with maximum particle size of 4 mm. Due to the fineness of the granular materials used and low water content (150 to 300 kg/m$^3$), high range water reducers (HRWR) or third generation superplasticizers are essential in the production of UHPC in order to obtain self-compacting ability or enough workability to fill formwork free of surface defects (air voids). The most used HRWR are based on, for example, a copolymer containing polyethylene glycol as graft chain and carboxylic functions in the main chain such as polycarboxylic ether. These, together with sodium polycarboxylate-polysulphonates and sodium polyacrylates, are generally called PCE-type superplasticizers. Additionally, the ductility of UHPC panels is possible due to addition of fibers, such as typical metallic (steel), organic (PVA, PP, PE, etc.) or inorganic fibers (basalt, AR-glass, etc.) or combinations thereof. During the process of casting UHPC in flat forms, these reinforcing fibers in the shape of monofilament or strands tend to be aligned with the concrete flow, producing undesirable lower flexural strengths (strength softening) and restricted displacements before failure in the parallel direction of applied wind loads. Thus, there is a need to find solutions obtaining products with higher flexural strength and maximum deflections.

UHPC is designed with a high cement content ranging between 700 and 1200 kg/m$^3$ which, upon hydration, precipitates high amounts of calcium hydroxide or portlandite inside the UHPC pore solution and interfacial transition zone (ITZ) of the aggregates. Furthermore, the final degree of hydration of the cement in UHPC ranges from 31% to 60% due to the very low water-to-cement ratio (w/c). The combining effects of the high amount of cement and low degree of hydration make the surface of UHPC facade panels susceptible to efflorescence. Efflorescence is the dissolution of portlandite or other soluble salts (i.e. Na or K sulfates) by the ingress of water, transport or leaching to the surface and the posterior re-crystallization of salts on the outside surface by drying and wet cycles. This phenomenon leaves undesirable white stains that, while not affecting the structural integrity of the panels, negatively impacts their esthetic appearance. This effect is undesirable for architectural and facade engineers.

On other hand, the huge amount of cement in UHPC not only affects production cost and consumes natural raw materials and energy (i.e. limestone, clay, coal, and electric power), but also has a negative effect on the environmental impact through carbon dioxide ($CO_2$) emission, which can contribute to the greenhouse effect. Furthermore, UHPC requires a relatively high content of silica powder and sand due to its extreme fineness. The use of silica quartz sand and silica powder in the UHPC do not satisfy sustainability requirements. The high cement and fine silica sand content with limited resources, high $CO_2$ footprint and high cost is considered as one of the drawbacks of UHPC use in the concrete market. There is thus a need for UHPC formulas for lower efflorescence potential (low cement content) and for other materials to substitute partially or fully with the silica sand in UHPC. The ultimate goal is to have more sustainable or ecological UHPC panels for the architectural field.

Porcelain is a ceramic building material with high bending strength, abrasion resistance and, when it is coated with a glass enamel, possesses excellent chemical resistance, making it ideal for sanitary applications (sanitaryware). Sanitaryware porcelain is produced by sintering (firing) a three component base mix composed of silica quartz, clay (i.e. ball clay or kaolin) and a flux mainly composed of feldspar rocks (alkaline bearing rock such as Nepheline, microcline, albite and others). The final ceramic body typically has a glass enamel and a ceramic body composed of mullite crystals of acicular shape (10-25% wt.), remaining silica quartz (5-25% wt.) and cristobalite (0-10%) particles, all embedded in a glassy matrix phase (50-80%). Generally, sanitaryware porcelain cannot be recycled because of breaking, color, mixing or expensive recycling cost. So, the amount of waste sanitaryware porcelain is increasing and almost all is dumped into landfill sites, which is not desirable because of the environmental impact. Therefore, there is a need to find products or a use in which waste sanitaryware porcelain can be incorporated.

Recently, extensive research has been carried out to find substitute material for the coarse aggregate in normal concrete, based on the application of recycled ceramic aggregates, mainly fire-clay red tiles. These have been focusing on the ecological effects but not on improving the mechanical properties or surface performance through lower efflorescence potential. Other limited research has been carried out on concrete made with sanitaryware porcelain ceramic waste [Bartosz et. al., Construction and Building Materials 122 (2016) 736-742] aggregates used for the substitute of some coarse and medium size fractions (<8 mm or 0-4 mm) of silica or basalt sand particulates in ultra-high strength concrete. Nevertheless, none of them have shown improvements in water absorption or freeze-thaw resistance due to the lack of an optimum mix design and the high angularity of coarser porcelain broken pieces.

SUMMARY OF THE INVENTION

It is therefore an aim of the present invention to address the above mentioned issues.

According to a general aspect, there is provided a composite architectural porcelain based ultra-high performance concrete with lower cement content, lower efflorescence potential and greater sustainability. The present invention replaces partially or fully the silica sand in UHPC facade panels with recycled sanitaryware porcelain sand while maintaining the desired combination of properties, especially compressive strength, flexural strength, modulus of rupture and efflorescence potential. The invention also provides a method to manufacture composite UHPC cladding panels having extended deflection.

In one aspect, the disclosed invention relates to a composite ultra-high performance porcelain concrete, comprising cement in an amount between 500 and 680 kg/m$^3$; and porcelain sand in an amount between 500 and 1200 kg/m$^3$.

In another non-limiting aspect, the cement comprises cement particles having an average particle size of less than 90 µm.

In a further non-limiting aspect, the cement has a specific surface area less than 2.0 m$^2$/g.

In still another non-limiting aspect, the cement has a Blaine fineness of less than 510 m$^2$/kg.

In a still further non-limiting aspect, the porcelain sand comprises a recycled porcelain sand.

In another non-limiting aspect, the porcelain sand has a particle size less than or equal to 1500 µm.

In still another non-limiting aspect, the porcelain sand has a particle size between 180 µm and 1500 µm.

In a further aspect of the disclosed invention, the concrete further comprises Nepheline-Syenite filler.

In a still further non-limiting aspect, the Nepheline-Syenite filler is present in an amount between 150 and 300 kg/m$^3$, and has a particle size less than 75 µm.

In a further non-limiting aspect, the concrete further comprises Nepheline-Syenite sand.

In yet another non-limiting aspect, the Nepheline-Syenite sand is present in an amount between 500 and 1200 kg/m$^3$, and has a particle size less than 1000 µm.

In a further non-limiting aspect, the concrete further comprises a reactive pozzolanic material.

In a still further non-limiting aspect, the concrete further comprises fibers selected from the group consisting of steel fibers, natural fibers, synthetic fibers and mixtures thereof.

In another non-limiting aspect, the concrete further comprises a total water content, before curing, of between 150 and 275 kg/m$^3$.

In still another non-limiting aspect, the concrete exhibits a compressive strength between 100 MPa and 120 MPa in a normal curing regime.

In a further non-limiting aspect, the concrete exhibits a three bending point flexural strength of between 10 and 35 MPa.

In a still further non-limiting aspect, the concrete exhibits a slump-flow of between 250 and 350 mm.

The presently disclosed invention also includes a method for preparing a concrete composition, comprising the steps of: processing a waste porcelain source material to produce a porcelain sand having a particle size smaller less than or equal to 1500 µm; and mixing the porcelain sand with cement to form the concrete composition wherein the composition contains the cement in an amount between 500 and 680 kg/m$^3$; and contains the porcelain sand in an amount between 500 and 1200 kg/m$^3$.

In another non-limiting aspect, the waste porcelain source material comprises a sintered three component base mix comprising silica quartz, clay and flux.

In still another non-limiting aspect, the porcelain sand comprises a glass enamel and an aggregate body comprising mullite crystals of acicular shape, remaining silica quartz, and cristobalite particles embedded in a glassy matrix phase.

The presently disclosed invention also includes a method for manufacturing a composite architectural porcelain base panel, comprising the steps of: pouring the concrete as disclosed herein into a urethane resin mold to form an initial concrete layer; setting an AR-glass mesh on the initial concrete layer; spreading a second concrete layer on top of the AR-glass mesh; setting a second AR-glass mesh on the second concrete layer; and spreading a third concrete layer over the second AR-glass mesh to form a composite panel.

In another non-limiting aspect, the composite panel is covered with a plastic sheet to avoid evaporation, and cured for at least 48 hours inside the mold.

In a further non-limiting aspect, after curing inside the mold, the panel is stripped from the urethane mold and further cured in a moist room 80° F. HR 80% for a period of about 14-21 days.

In still another non-limiting aspect, the third concrete layer has a thickness of about 4 to 7 mm.

In a still further non-limiting aspect, the second concrete layer has a thickness of about 7 to 9 mm.

In a further non-limiting aspect, the third concrete layer has a thickness of about 1 to 4 mm.

In another non-limiting aspect, the resultant composite panel comprises two to three AR-glass mesh layers.

In a further non-limiting aspect, the AR-glass mesh comprises woven yarn of 1200 Tex (g/Km) made of alkaline resistance glass.

In still another non-limiting aspect, the yarn is manufactured of a glass with zirconia ($ZrO_2$) content greater than 16% wt.

In a still further non-limiting aspect, the final composite panel after curing, has a thickness of about 12.7 to 25.4 mm.

In a further non-limiting aspect, the composite panel has a flexural first crack value of about 10 to 20 MPa when testing in a three bending test.

In another non-limiting aspect, the composite panel has an ultimate module of rupture, determined by three bending test, of about 22 to 60 MPa.

In a further non-limiting aspect, the composite panel, after secondary curing, is treated with a penetrating hydrophobic sealer to impart water beading, anti-graffiti and color control effects to a surface of the panel when exposed to environment and vandalism.

In still another non-limiting aspect, the penetrating hydrophobic sealer comprises waterborne silanes, flour-silanes, alkoxy-silanes and mixtures thereof.

In a still further non-limiting aspect, the composite panel, after secondary curing, is stained with waterborne solid color coating.

In a further non-limiting aspect, the solid color coating constitutes water based emulsions of acrylic, vinyl acetate/versatate, styrene acrylic copolymers and/or a mixture thereof.

In a still further non-limiting aspect, the solid color coating is pigmented or un-pigmented.

In another non-limiting aspect, the solid color coating has a solid content of about 22 to 50% wt and a volatile organic content (VOC) lower than 224 g/l.

In still another non-limiting aspect, the concrete is used to manufacture a shape form by gravity casting, pressure casting a or combination thereof.

In another non-limiting aspect, the shape form comprises corners, fins, decorative screens, architectural elements and combinations thereof.

BRIEF DESCRIPTION OF THE DRAWINGS

A detailed description of embodiments of the disclosure follows, with reference to the attached drawings, wherein:

FIG. 1 illustrates average cumulative particle size distribution curves of main raw materials used to manufacture exemplary CA-UHPPC matrix in composite panels (UHPC+Fibers+Mesh);

FIG. 2 illustrates optical photo-micrographs of Nepheline-Syenite and recycled porcelain sand particles;

FIG. 3 illustrates heat flow of the different porcelain-based (Mix B and Mix C) and reference (Ref-1) UHPC;

FIG. 4 illustrates cumulative total heat of the different porcelain based (Mix B and Mix C) and reference (Ref-1) UHPC;

FIG. 5 illustrates three bending stress versus deflection of Ref-1 UHPC composite panels; and FIG. 6 illustrates three bending stress versus deflection of CA-UHPPC (Mix D) composite panel.

DETAILED DESCRIPTION

The disclosure relates to a composite architectural ultra-high performance concrete panel and method of producing same wherein porcelain sand is used to partially or fully replace silica sand and to optimize the particle packing of UHPC matrix. In an embodiment, porcelain sand is obtained in the form of ground recycled sanitaryware porcelain. The recycled porcelain, or waste porcelain, can be a sintered three component base mix comprising silica quartz, clay and flux, as one particularly well suited example.

The composition of the composite architectural ultra-high performance porcelain based concrete (CA-UHPPC) mix includes cement, reactive pozzolanic material such as silica fume and metakaolin, a superplasticizer such as polycarboxylic ether or PCE-type, fibers, water, and optionally, Nepheline-Syenite sand and fine powder. The composition of the porcelain based UHPC is shown in Table 1 below.

TABLE 1

Composition of CA-UHPPC matrix.

| Name | Mix design (Kg/m³) |
| --- | --- |
| White Cement | 500-680 |
| Gray Cement (Class G) | 500-680 |
| Silica fume (zirconium based) | 0-163 |
| Silica fume (ferrosilicon based) | 0-163 |
| Metakaolin | 0-163 |
| Nepheline-Syenite (filler) | 150-300 |
| Nepheline-Syenite (Medium) | 500-1200 |
| Nepheline-Syenite (Coarse) | 0-600 |
| Porcelain sand (18/80) | 500-1200 |

As mentioned above, the composition of CA-UHPPC constitutes between 500 to 680 kg/m³ of cement, with one particularly suitable amount being 600 kg/m³ of cement. In one embodiment, the cement particles have an average particle size smaller than about 90 μm, and the cement (sphere based) specific surface area is lower than 2.0 m²/g or preferably the cement has a Blaine fineness lower than 510 m²/kg. In an embodiment, the cement can be white cement Type I classified according to ASTM C150 or Class G gray oil-well cement type HSR (high sulfate resistance) classified according to API Spec. 10A. Table 2 below sets forth typical granular material characteristics and additional details of suitable characteristics of various granular components of CA-UHPPC. Within these boundaries, in one embodiment, white cement can have a mean average size of 15.34+/−2.8 microns, and oil-well cement can have a mean average size of 25.9+/−3.2 microns. These values are within those shown in Table 2, along with exemplary D[10], D[50] and D[90] values.

TABLE 2

Raw material characteristics (granular materials)

| Name | Density (g/cm³) | Specific surface area (m²/g) | Mean particle size (μm) | Particles parameters [D10/D50/D90] (μm) |
| --- | --- | --- | --- | --- |
| White Cement | 3.13 | 0.74-1.47 | 9.8-20.4 | 0.8/11.1/34.3 |
| Gray Cement (Class G) | 3.15 | 0.68-1.10 | 19.6-32.3 | 1.2/17.5/62.7 |
| Silica fume (zirconium based) | 2.30-2.40 | 10-17* | 0.6-3.0 (300 nm)⁺ | 0.5/0.9/9.1 |
| Silica fume (ferrosilicon based) | 2.20-2.30 | 20-44* | 0.2-0.9 (150 nm)⁺ | 0.2/0.4/2.7 |
| Metakaolin | 2.50 | 0.93-1.27 | 5.1-6.6 | 1.0/3.9/12.9 |
| Nepheline-Syenite (filler) | 2.61 | 0.48-0.70 | 16.4-25.8 | 1.7/14.6/49.7 |
| Nepheline-Syenite (Medium) | 2.61 | 0.01-0.03 | 256.3-313.2 | 121.9/273.5/467.0 |
| Nepheline-Syenite (Coarse) | 2.61 | 0.06-0.012 | 687.2-760.5 | 506.5/711.4/973.3 |
| Porcelain sand (18/80) | 2.59 | 0.005-0.008 | 634-676 | 204.8/552.5/1279 |

*BET surface area,
⁺primary particles

As mentioned above, the composition of the CA-UHPPC can be constituted of recycled porcelain sand. In an embodiment, the composition is comprised of porcelain sand in an amount ranging between 500 to 1200 kg/m³ or preferably ranging from 600 to 1000 kg/m³, for example one suitable value is 756 kg/m³. In this embodiment, the porcelain sand has particles smaller than #18 ASTM E-11 Mesh (1000 μm) and, in a particular embodiment, has particle sizes between #80 ASTM E-11 Mesh (180 μm) and about #18 ASTM E-11 Mesh (1000 μm). In a particular embodiment, the porcelain sand has particles smaller than 1500 μm, with an average D[10], D[50] and D[90] of about 204.8 μm, 552.5 μm and 1279 μm, respectively. D[10], D[50], D[90] are measured by laser light scattering (LLS) and polarization intensity differential scattering (PIDS) techniques using a Beckman-Coulter LS13320 particle size analyzer using the standard methods described on ISO 13320-1 (1999).

In this embodiment, porcelain sand is graded sanitaryware porcelain which has been produced by sintering (firing) a three component base mix composed of silica quartz, clay (i.e. ball clay or kaolin) and a flux mainly composed of feldspar rocks (alkaline bearing rock such as Nepheline, microcline, albite and others). In this embodiment, the porcelain sand typically has a glass enamel and an aggregate body composed of mullite crystals of acicular shape(10-25% wt.), remaining silica quartz (5-25% wt.) and cristobalite (0-10%) particles, all of these embedded in a glassy matrix phase (50-80%). More particularly, in the embodiment, porcelain sand is used to replace, partially or fully, the quartz or Nepheline-Syenite sand in UHPC production.

The composition of the CA-UHPPC can constitute Nepheline-Syenite filler (powder). In an embodiment, the composition constitutes Nepheline-Syenite in a concentration ranging between 150 and 300 kg/m$^3$, or preferably 286 kg/m$^3$. In another embodiment, Nepheline-Syenite filler is characterized with particles smaller than #200 ASTM E-11 Mesh (75 μm). In a particular embodiment, Nepheline-Syenite filler has particles smaller than 150 μm, with an average D[10], D[50] and D[90] of about 1.7 μm, 14.6 μm and 49.7 μm, respectively. D[10], D[50], D[90] can be measured by (LLS) and polarization intensity differential scattering (PIDS) techniques using a Beckman-Coulter LS13320 particle size analyzer using the standard methods described in ISO 13320-1 (1999).

Optionally, the composition of the CA-UHPPC can constitute Nepheline-Syenite sand. In an embodiment, the composition constitutes Nepheline-Syenite sand in a concentration ranging between 500 and 1200 kg/m$^3$, or preferably 263 kg/m$^3$. In an embodiment, Nepheline-Syenite sand is characterized with particles smaller than #18 ASTM E-11 Mesh (1000 μm). In a particular embodiment, Nepheline-Syenite filler has particles smaller than 700 μm, with an average D[10], D[50] and D[90] of about 121.9 μm, 273.5 μm and 467.0 μm, respectively. D[10], D[50], D[90] again can be measured by (LLS) and polarization intensity differential scattering (PIDS) techniques using a Beckman-Coulter LS13320 particle size analyzer using the standard methods described on ISO 13320-1 (1999).

In an embodiment, the composition of the CA-UHPPC further constitutes silica fume (SF) as a reactive pozzolanic material. It is understood that reactive pozzolanic materials include silica fume, also known as micro-silica, which is a byproduct in the production of silicon or ferro silicon alloys (ferrosilicon based). In an alternative embodiment, the composition can contain zirconium based silica fume, which is a byproduct in the production of zirconium-Silica or/and zirconium-calcium refractories. In another embodiment, the composition of the CA-UHPPC can constitute reactive pozzolanic material, such as silica fume in a concentration ranging from 0 to 163 kg/m$^3$, preferably a concentration of 71 Kg/m$^3$. In an embodiment, silica fume particles are 90% smaller than about #325 ASTM E-11 Mesh (45 μm) and the silica fume particles have a BET specific surface area between 10 to 50 m$^2$/g. In a particular embodiment, silica fume has primary particles between about 50 nm to 600 nm in size, measured by scanning electron microscopy (SEM) and secondary aggregates particles (clusters) with an average D[10] between about 0.061 μm to 0.563 μm, D[50] between about 0.077 μm to 1.08 μm and D[90] of between about 2.0 μm to 31 μm. D[10], D[50], D[90], as mentioned above, can be measured by (LLS) and polarization intensity differential scattering (PIDS) techniques using a Beckman-Coulter LS13320 particle size analyzer using the standard methods described on ISO 13320-1 (1999).

In an alternative embodiment, other reactive pozzolanic materials such as calcinated clay may be used, preferably calcinated kaolin clay from a flash burning process may be used. In an embodiment, CA-UHPPC can include a mixture of silica fume and/or metakaolin in a concentration ranging from about 0 to 326 kg/m$^3$, preferably a concentration of 71 Kg/m$^3$. In an embodiment, metakaolin particles are 95% smaller than about #400 ASTM E-11 Mesh (38 μm) and metakaolin particles have a spherical base specific surface area between about 0.500 to 1200 m$^2$/g. In a particular embodiment, metakaolin has a mean particles size of about 2.4 to 19 μm, metakaolin particles have a distribution with an average D[10] between about 0.74 μm to 1.6 μm, D[50] between about 1.8 μm to 10.5 μm and D[90] of between about 3.0 μm to 50 μm. D[10], D[50], D[90] can be measured by (LLS) and polarization intensity differential scattering (PIDS) techniques using a Beckman-Coulter LS13320 particle size analyzer using the standard methods described in ISO 13320-1 (1999).

The composition of the CA-UHPPC also constitutes fibers (such as steel fibers, natural fibers, and synthetic fibers), a superplasticizer, and water. The fibers are added to control drying shrinkage, fire spalling, tensile strength and to improve ductility. In an embodiment, the fibers are micro-fibers such as fibers having a length of about 3 to 36 mm, and more particularly about 6 to 12 mm, and a diameter of about 10 to 500 μm, and more particularly monofilament or bundles of fibers having a diameter of about 20 to 300 μm. In an embodiment, the composition constitutes fibers in a concentration ranging between 0.01 and 5.0% based on total volume of the mix, or between 1.0 and 2.0% of the total volume of the mix. In an embodiment, micro-fibers constitute alkaline resistance glass fiber (AR-glass) meeting the specification according to ASTM C1666. In an embodiment, AR-glass fibers are manufactured with a zirconia (ZrO$_2$) content greater than 16% by weight which conforms with the Precast Concrete Institute (PCI) manual [Appendix F of PCI MNL 130]. Particularly, in an embodiment, AR-glass fibers constitute bundles of glass filament bonded together with 0.8% wt. of sizing polymer, engineered to survive high intensity mixing, aspect ratio of 58 and a tensile strength greater than 1700 MPa. In an embodiment, the composition constitutes AR-glass fibers in a concentration of about 40.5 kg/m$^3$, or preferably 1.5% based on the total volume of the mix.

In an alternative embodiment, other microfiber such as polypropylene fibers (PP fibers) may be used. In an embodiment, PP fibers constitutes 100% virgin homopolymer polypropylene multifilament (monofilament) containing no reprocessed olefin materials. Particularly, in an embodiment, PP fibers constitute 6 mm water-dispersible monofilaments with a specific density of about 0.91 and melting point of 160° C. In an embodiment, the composition constitutes PP fibers in a concentration of about 1 to 5 kg/m$^3$, or preferably 0.01% based on the total volume of the mix.

The superplasticizer used with the CA-UHPPC mixture is a high-range water reducer composed of organic polymers used to disperse cement particles and improve the workability of mixes (slump-flow). In one embodiment, the superplasticizer constitutes polyacrylate and, more particularly, polycarboxylate (PCE-type), which works essentially by steric repulsion. In an embodiment, the composition constitutes PCE-type superplasticizer type-A and type-F according to ASTM C494 standard. In an embodiment the superplasticizer is a polymer/water dispersion with 25 to 100% active solid content, with a specific gravity of about 1.0 to 1.15 and a pH range between about 3 to 6. Preferably, the composition constitutes a PCE-type superplasticizer with 30% solids, a specific gravity of 1.06 and a pH of 6. In an embodiment, the composition constitutes between 25 kg/m$^3$ and 60 kg/m$^3$ of superplasticizer, or more preferably between 30 kg/m$^3$ and 35 kg/m$^3$ of superplasticizer.

The CA-UHPPC has a total water content between 150 kg/m³ and 275 kg/m³, or more preferably between 190 kg/m³ and 215 kg/m³. The water content may be determined in accordance with the water-to-cement or water-to-binder ratio.

The resulting CA-UHPPC is characterized by a compressive strength between 100 MPa and 120 MPa in normal curing regime and, in a particular embodiment, between 110 MPa and 140 MPa if a secondary thermal curing is applied. In an embodiment, CA-UHPPC is characterized by a three bending point flexural strength between 10 MPa and 35 MPa, preferably a flexural strength of about 11 to 20 MPa. In a particular embodiment, the CA-UHPPC is further characterized by a splitting tensile strength of about 6 to 10 MPa.

In an embodiment, CA-UHPPC is characterized by a slump-flow between 250 and 350 mm. The slump-flow of the CA-UHPPC can be measured using the cone flow (Hägerman cone) described in ASTM C 1437-07. Furthermore, in an embodiment, CA-UHPPC composition is characterized by water-to-binder ratio between 0.10 and 0.35 and, in a particular embodiment, between 0.25 and 0.32. The binder (b) is composed of cement, like Portland cement type I, and the reactive pozzolanic material such as silica fume and metakaolin. More specifically, the water-to-binder ratio is defined as the ratio by weight of water to cement+silica fume+metakaolin. In an embodiment, the CA-UHPPC composition is also characterized by a water-to-solid ratio by weight of about 0.090 to about 0.150, more particularly, a water-to-solid ratio of about 0.105 to about 0.112. In an embodiment, the water-to-solid ratio is defined as water to the dry mix, i.e. all constituents except water and the amount of solid content in the superplasticizer.

In an embodiment, CA-UHPPC is characterized by an optimized particle packing of the dry or granular constituents of the mix, in this example, cement, silica fume, metakaolin, filler and sands. Particle packing deals with the problem of selecting the appropriate particle size distribution and amounts of each granular material to obtain a compacted or strongest, low porosity mix (less voids). For achieving a granular mixture with a relatively low porosity, more fine particles are needed to fill the voids of the system. Fine particles fill the interstitial space between the different fraction of granular materials releasing water that helps to lubricate the system and improve workability. In an embodiment, the optimized amount of granular material required to provide maximum packing was determined by using the continuous particle packing model and mix algorithm published by Radix and Brouwers [Brouwers, J., & Radix, H. J. (2005). Self-compacting concrete: theoretical and experimental study. Cement and concrete research, 35(11), 2116-2136].

$$P'(D) = \frac{D^q - D_{min}^q}{D_{max}^q - D_{min}^q} \quad \text{Eq. (1)}$$

The previous equation (Eq. (1)) describes the grading of continuous mixes of particles size populations considering a minimum ($D_{min}$) and maximum ($D_{max}$) size of particles that are present in the UHPC mix. (q) is the distribution modulus which controls the amount of fine material. In this embodiment, q values were selected between about 0.20 to 0.25, preferably about 0.23, to obtain an optimized packing mixture applicable to UHPC formulations. Hence, an aimed composition of the granular mix considering the grading line given by Eq. (1) can result in a paste that meets the minimum void content and, as a consequence, minimum water demand. An example is displayed in FIG. 1. The algorithm considers (m) ingredients (k=1, 2, . . . , m), including the non-solid ingredients air and water. For the mix analysis using Eq. (1), the geometric mean ($D_i$, geom. i+1) of the upper and lower sieve size of the respective fraction obtained by LLD or PIDS analysis was taken as particle size (D) and follows from:

$$D_{i,geom.}^{i+1} = \sqrt{D_i \cdot D_{i+1}} \text{ for } i=1, 2, \ldots, n \quad (2)$$

The sizes of the fractions vary in steps of √2 starting from 0.01 μm up to 125 mm. Consequently, 44 sizes (i=1, 2, . . . , n+1) were identified, and 43 fractions (n) are available for the classification of the solid ingredients. Taking this wide range of the PSD of the granular ingredients into account, the entire grading of both materials was considered in order to obtain a theoretically optimized mix for maximum packing of UHPC. Using the physical properties of the solids, such as specific density ($\rho_{spe}$), specific surface area (SSA), and their PSDs, a grading line (cumulative finer fraction) of the composed mix was generated on volume base, given by:

$$P_{mix}(D_{i,geom.}^{i+1}) = P_{mix}(D_{i,geom.}^{i-1}) - Q_{mix}(D_i), \text{ for } i=1, 2, \ldots, n-1 \text{ or} \quad (3)$$

$$P_{mix}(D_{i,geom.}^{i+1}) = 1, \text{ for } i=n \quad (4)$$

where Qmix is equal to:

$$Q_{mix}(D_i) = \frac{\sum_{k=1}^{m-2} \frac{v_{sol,k}}{\rho_{spe,k}} Q_{sol,k}(D_i)}{\sum_{i=1}^{n} \sum_{k=1}^{m-2} \frac{v_{sol,k}}{\rho_{spe,k}} Q_{sol,k}(D_i)} \quad (5)$$

The various physical properties, such as sphere based specific surface area, particle size distribution, density, and other properties for the different materials used were determined, as indicated in Table 2, and taken into consideration for obtaining the optimum dry materials mixes. Once the optimum mix of granular materials were found, the amount of water and superplasticizer were determined by varied slump-flow tests for a target initial slump-flow diameter of 300 mm.

FIG. 1 shows average cumulative particle size distribution curves of main raw materials used to manufacture CA-UHPPC matrix in composite panels (UHPC+Fibers+Mesh).

In an alternative embodiment, other dry materials such as pigment may be used to impart aesthetic colors to CA-UHPPC. In an embodiment, pigments constitute ground natural and/or synthetic metallic oxides and hydroxides such as α-$Fe_2O_3$ (red), $Fe_3O_4$ (black), α-FeOOH (yellow), R—$TiO_2$ or/and A-$TiO_2$ (white), α-$Cr_2O_3$ (green), (Co, Ni, Zn)$_2$(Ti,Al)$O_4$ (green), Co(Al,Cr)$_2O_4$ or/and CoAl$_2O_4$ (blue). Particularly, in an embodiment, pigments are UV resistance and water dispersible. In an embodiment, the composition constitutes pigments in a concentration of about 0.1 to 10% wt. based on cement content.

The present invention also provides a method for manufacturing composite architectural panels using the CA-UHPC mixes of the present invention such panels can be composed of UHPC matrix and 2 or more layers of grit (reinforcing mesh). Such panels can be composed of UHPC matrix and 2 or more layers of grit. The methods described below ensure that high quality cladding panels are obtained. In a first step, a fresh UHPC mix is obtained. This includes adding the dry material to a high intensity mixer and mixing for 1 to 3 minutes. Without being limitative, dry materials can include porcelain sand, Nepheline-Syenite sand, powder, pigments, cement, silica fume and metakaolin. Then, the superplasticizer and water are added and mixed at high speed and energy for 3 to 6 minutes until the mix transitions from a moist mass to a self-compacting solid dispersion. Next, the fibers, if any, are added and mixed at low shear for 1 minute to obtain a fresh UHPC. After obtaining the mix, the UHPC is poured into a previously prepared urethane resin mold sprayed with mold release, forming an initial concrete layer having a thickness of about 4 to 7 mm, preferably 5 mm. Immediately after the first layer is formed, an AR-glass mesh is set (grit). Then another UHPC layer is spread with a thickness of about 7 to 9 mm, on top of which a second AR-glass mesh is set and covered with a final layer of UHPC of about 1 to 4 mm, preferably 2 mm. The resultant composite panel is covered with plastic sheet to avoid evaporation and cured (initial cure) for 48 hours inside the mold. After the initial cure, the panel is stripped from the urethane mold and further cured in a moist room (80 F, HR80%) for a period of about 14 to 21 days.

In an embodiment, the CA-UHPPC panels are constituted of two to three AR-glass mesh layers, preferably two. In an embodiment, AR-glass mesh constitutes woven yarn of 1200 Tex (g/Km) made of alkaline resistance glass meeting the specification of ASTM C1666. In an embodiment, AR-glass yarn is manufactured with a zirconia ($ZrO_2$) content greater than 16% by weight which conforms to the Precast Concrete Institute (PCI) manual [Appendix F of PCI MNL 130]. Particularly, in an embodiment, AR-glass yarn is constituted of glass filament with 1200 Tex (density) coated with about 15 to 45% wt. of sizing polymer engineered to increased bonding strength and flatness of the mesh. In an embodiment, the sizing polymer is a waterborne latex emulsion which constitutes styrene butadiene copolymers, acrylics, alkyds, polyvinyl acetate, polystyrene and/or mixture a mixture thereof. In an embodiment, the AR-glass mesh is constructed with a square weaving or knit process with yarn counts of about 4 to 12 every 10 cm in the machine (warp) and weft (weaving) directions, preferably AR-glass constituted of a 10×10 weaving configuration. In an embodiment, the AR-glass mesh has a tensile strength of about 2900 N/5 cm to 6000 N/5 cm in each direction (warp/weft), preferably, AR-glass mesh has minimum tensile strength in warp and weft direction of about 4600 N/5 cm.

In an optional embodiment, the resultant composite panels (UHPC+fiber+mesh) are characterized by a thickness of about 12.7 to 25.4 mm (0.5 to 1 in.), preferably 15.875 mm (⅝ in.). In this embodiment, the composite panel is characterized by a flexural first crack value of about 10 to 20 MPa when testing in a three bending test configuration according to ASTM C1185. In this embodiment, the composite panels are characterized by an ultimate module of rupture, determined according to ASTM C1185, of about 22 to 60 MPa, preferably of about 28 to 40 MPa. In an optional embodiment, the composite panels are characterized by an anchor pull-out force of about 400 to 1200 lbf, preferably an anchor pull-out force of about 520 to 700 lbf. In the embodiment, the composites' anchor pull-out force is determined with a concealed anchor configuration according to ASTM E488 procedure. In this embodiment, the panel anchor pull-out force is determined on inserted depths of about 8.5 to 13 mm, preferably 10 mm.

In an alternative embodiment, the composite panels after secondary curing are treated with penetrating hydrophobic sealers to impart water beading, anti-graffiti and color control effects to the panel surface when exposed to the environment and vandalism. In an embodiment, the penetrating sealer constitutes waterborne silanes, flour-silanes, alkoxy-silanes and mixtures thereof. Preferably, in an embodiment, the penetrating sealer constitutes a waterborne flour-silane with a solid content of 15% wt, density of about 983 kg/m$^3$ and a volatile organic content (VOC) lower than 20 g/l.

In an alternative embodiment, the composite panels after secondary curing are stained with waterborne solid color coating. In an embodiment, the solid color coating constitutes water based emulsions of acrylic, vinyl acetate/versatate, styrene acrylic copolymers and/or a mixture thereof. In an embodiment, the solid color coating is pigmented or un-pigmented (clear). In an embodiment, the solid color coating has a solid content of about 22 to 50% wt and a volatile organic content (VOC) lower than 224 g/l.

The solid color coating which can be used to stain the composite panels can advantageously have a solid content of about 22-50% wt., and a volatile organic content (VOC) of less than 224 g/l.

In one non-limiting embodiment, the method of forming panels according to the present disclosure can be used to manufacture a shape form by gravity casting, pressure casting or combinations thereof. Further, the shape form can comprise corners, fins, decorative screens, architectural elements and combinations thereof.

EXAMPLES

The following examples further illustrate the architectural UHPC compositions disclosed herein.

Example 1

Recycled Porcelain Sand Characteristics

Recycled porcelain sand produced by Maryland Refractories Ltd. was used for the examples. Reclaimed waste white sanitaryware is crushed and sieved obtaining a retained fraction of particles of which 100% pass sieve #18 (1000 μm) and are retained on sieve #80 (180 μm). The equivalent particle size distribution measured by LLD and PIDS is shown in Table 2 and FIG. 1. Porcelain sand estimated chemical composition is determined by XRF and is shown in Table 3. Respective crystalline phase semi-quantitative analysis by XRD is shown in Table 4.

TABLE 3

Chemical composition of Porcelain sand by XRF analysis

| Name | Porcelain sand (% wt.) | Nepheline-Syenite sand (medium) (% wt.) |
|---|---|---|
| $SiO_2$ | 68.18-68.41 | 58.30-61.20 |
| $Al_2O_3$ | 22.79-23.63 | 23.40-24.1 |
| $Fe_2O_3$ | 1.00-1.11 | 0.10-1.70 |
| CaO | 1.64-2.11 | 0.40-0.80 |
| MgO | 0.14-0.40 | 0.02-0.10 |
| $K_2O$ | 1.96-2.16 | 4.90-5.30 |
| $Na_2O$ | 1.05-1.37 | 10.30-10.90 |
| $TiO_2$ | 1.03-1.30 | — |
| $ZrO_2$ | 0.26-0.49 | — |
| $Cr_2O_3$ | 0.05-0.08 | — |
| $P_2O_5$ | 0.08-0.10 | — |
| $Rb_2O$ | <0.02 | — |
| ZnO | 0.08-0.21 | — |
| BaO | 0.07-0.08 | — |
| SnO | <0.02 | — |
| PbO | <0.01 | — |

A comparison of the chemical composition by XRD/XRF and particle shapes between a recycled porcelain sand and typical Nepheline-Syenite sand used for UHPC formulation is shown in Table 3, Table 4 and FIG. 2, respectively.

TABLE 4

Crystalline phase semi-quantitative analysis of Porcelain sand by XRD analysis

| Identified phase | Estimated mass (% wt.) |
| --- | --- |
| Amorphous phase (non-crystalline) | <50.6 |
| $SiO_2$-Quartz (78-1252) | 23.0 |
| $SiO_2$-Cristobalite (82-0512) | <0.94 |
| $SiO_2$-Tridymite (86-0680) | <0.11 |
| $\alpha$-$Al_2O_3$-Corundum (71-1123) | 7.0 |
| $3Al_2O_3 \cdot 2SiO_2$-Mullite (74-2419) | 14.7 |
| $Na(AlSi_3O_8)$-Albite (80-1094) or $Ca(Al_2Si_2O_8)$-Anorthite (75-1587) | 3.7 |

Raw Material and Mixture Proportioning

Various raw materials and cementitious binders were tested (Table 5): Type I white cement, Glass G gray oil-well cement, silica fume (ferrosilicon and zirconium based) and Nepheline-Syenite powder (filler). Nepheline-Syenite coarse sand with a particle distribution between 400 μm and 1000 μm, Nepheline-Syenite fine sand with a particle distribution between 120 μm and 700 μm and recycled porcelain sand with a particle distribution between 150 μm and 2000 μm were used as aggregates for the examples below. In total, five UHPC base mixture proportions with water-to-binder ration between 0.25 to 0.31 were cast (Table 5).

This allowed decreasing the water demand further. As a consequence, the AR-glass fiber and water amount were decreased.

In order to prepare the UHPC according to the invention, the different raw materials were mixed with water using an Eirich RV 02E high intensity mixer with a pin type-rotor and rotating bowl. The following order of mixing was adopted. Mixing of the powder constituent and sand at low rotor (19 Hz) and bowl (25 Hz) speeds for 1 min; introduction of water and superplasticizer for a period of 1 min 15 sec; at the end of water addition mixing at high rotor speed (70 Hz) for 3 min 15 sec; stop mixing and scrap dry material from bowl walls; introduction of AR-glass fiber and mixing at low rotor speed (15 Hz) for 1 additional min.

As soon as mixing was completed, the measurements of the rheological properties of the fresh UHPC were performed using the modified slump-flow test (ASTM C 1437-07). The test consists of a mini slump cone (70 mm in top diameter, 100 mm in bottom diameter, and 60 mm in height). To perform the test, the mini slump cone (Hagerman-type) was filled with fresh UHPC then removed to allow the UHPC to flow outward by gravity. Once the UHPC reached a steady state (2 min), four diameters were taken to determine the average slump-flow diameter.

After the slump-flow test was completed, fresh UHPC mixes were cast on prismatic molds (40×40×160 mm) and covered with plastic sheets for initial 2-d curing in a fog room (80 F, RH>80%). After initial curing the samples were demolded and cured (normal curing) underwater for an additional 26 days, after which the samples were removed

TABLE 5

Composition of different UHPC mixes

| | UHPC Mixes | | | | | |
| --- | --- | --- | --- | --- | --- | --- |
| Material | UHPC* | Ref-1 | Mix A | Mix B | Mix C | Mix D |
| | Amount (Kg/cm³) | | | | | |
| White Cement | 650-1000 | 800 | 600 | 600 | — | 600 |
| Gray Cement (Class G) | 650-1000 | — | — | — | 600 | — |
| Silica fume (zirconium based) | — | — | — | — | — | 71 |
| Silica fume (ferrosilicon based) | 40-300 | 65 | 71 | 71 | 71 | — |
| Metakaolin | — | 65 | 71 | 71 | 71 | 71 |
| Nepheline-Syenite (filler) | 100-350ˆ | 158 | 286 | 286 | 286 | 286 |
| Nepheline-Syenite (Medium) | 1000-2000⁺ | 500 | 263 | 263 | 263 | 263 |
| Nepheline-Syenite (Coarse) | 0-200⁺ | 538 | — | — | — | — |
| Porcelain sand (18/80) | — | — | 756 | 756 | 756 | 756 |
| AR-glass strands (12 mm) | 0-200 | 54 | 54 | 54 | 54 | 40.5 |
| Superplasticizer (PCE-type) | 10-40 | 35 | 30 | 30 | 30 | 30 |
| Water | 110-200 | 210 | 215 | 215 | 215 | 205 |
| Water/binder | <0.29 | 0.248 | 0.314 | 0.314 | 0.314 | 0.305 |
| Water/solid | <0.112 | 0.106 | 0.111 | 0.111 | 0.111 | 0.108 |

*Typical commercial UHPC,
⁺Quarzitic sand (crystalline α-quartz),
ˆGround limestone or precipitated calcite, silica flour or other 400 mesh ground mineral.

Ref-1 original mix design was selected as the reference UHPC base mix used in the manufacturing of facade composite panels.

Mixes A and B were obtained using a granular materials optimization method, selecting a target amount of white cement of 600 kg/m³.

Mix C was obtained by replacing 100% wt. of white cement in the Mix B with Glass G gray oil-well cement.

Mix D was obtained by replacing 100% wt. of ferrosilicon Silica fume in the Mix B with Zirconium based silica fume.

from the water bath and tested for flexural and compressive strength.

Optionally, a secondary thermal curing was applied to accelerate measurement of properties. This consisted of curing 2-d demolded UHPC mixes in an environmental chamber at 60° C. and a relative humidity of 75% for about 6 days. To carry out this curing process, temperature was slowly raised during the first 2 hours to 60° C. at a normal lab relative humidity. Then, the chamber's relative humidity was increased to 75% in a period of 1 hour. These conditions stayed constant for 6 days, at which point the temperature and humidity were naturally allowed to return to lab conditions.

UHPC Flexural strength was measured according to the modified procedure of the ASTM C348-02. For this, an Instron 3369 universal tester digitally controlled was used. The load rate was adjusted (25-35 N/s) to get an average breaking time of 3 min for each sample.

Similarly, UHPC compressive strength was determined from broken pieces of the prismatic samples coming from flexural tests according to the ASTM C349-14 modified procedure. For this, a hydraulic manually controlled TestMark CM-0030 compressive machine was used with an approximate load rate of 1400 N/s to obtain an ultimate compressive failure in 3 min. The fresh and hardened state properties of the UHPC are displayed in Table 6.

TABLE 6

Fresh (slump-flow) and hardened properties (flexural and compressive strengths) of different UHPC mixes tested

| UHPC Mixes | Slump-flow (cm) | Flexural Strength (MPa) | Compressive Strength (MPa) |
| --- | --- | --- | --- |
| Ref-1 | 29.0 ± 3.0 | 15.0 ± 1.2 | 110 ± 5 |
| Mix A | 29.0 ± 0.5 | 15.6 ± 0.5 | 118 ± 5 |
| Mix B | 31.0 ± 0.7 | — | — |
| Mix C | 31.0 ± 0.4 | — | — |
| Mix D | 30.3 ± 0.3 | 15.4 ± 1.0 | 119 ± 2 |

The use of porcelain sand with an optimized particle packing, from the data presented in Table 6, led to equivalent slump-flow values compared with REF-1 mix (workability). This illustrated that the UHPCs according to the present invention using optimized particle packing and well graded recycled porcelain aggregates, minimized the effects of more angular particles and led to the use of less superplasticizer for the same workability target range.

The type of sand used, Nepheline-Syenite versus recycled porcelain sand, has an important influence on the flexural and compressive strength. Comparing the Ref-1 mix and Mixes A and D, Mix A exhibited higher flexural and compressive strength at the same age (28-d) when a normal curing method is applied. Similarly, Mix D exhibited higher flexural and compressive strengths when secondary thermal curing is applied. For example, the flexural strength at normal curing (28-d) were 15.0 and 15.6 MPa for Ref-1 and Mix A, respectively. Meanwhile, compressive strength increased from 110 MPa for the Ref-1 to 118 MPa for Mix A, despite the use of less cement and a higher water content compared to Ref-1 mix. In the same way, the compressive strength of the secondary cured Mix D increased to 119 MPa. The increase in properties (flexural and compressive) on the mixes with recycled porcelain is due to the optimized particle packing and the fact that the porcelain particles absorb mixing water that is later released to enhance the hydration degree of the UHPC matrix (internal curing). Additionally, the high content of amorphous phase in the porcelain increases the bonding between the cementitious matrix and the porcelain aggregates because of an interphase pozzolanic reaction and densification of the interfacial transition zone (ITZ)of the sand particles. This illustrates that the concrete of the present invention has improved the mechanical properties compared to a reference UHPC even though the water was higher, and the cement content was lower in the present invention mixes (water-to-cement ratio of 0.31).

The use of porcelain sand in the concrete of the present invention leads to UHPC mixes with lower cement content and a high amount of recycled material (38% wt). This combination decreases the $CO_2$ footprint of the concrete and increases the sustainability of architectural composite UHPC panels, without compromising workability and mechanical properties.

Example 2

Ref-1, Mix B and Mix C from Example 1, were cast in 0.5 in. thick (14×26 in.) urethane smooth molds to obtain panels reinforced with two layers of AR-glass mesh with a 10×8 yarn count and a minimum tensile strength of 4600N/5 cm in warp and 3600N/5 cm in the weft direction, respectively. The composite UHPC panels were covered with a plastic sheet and let cure in the molds for two days. Afterwards, the panels were demolded and cured in a moist room (80 F, RH80%) for a minimum of 16 days. Once cured, the panels were removed from the curing room and processed to produce small-size panels of 2×4 in. and 4×6 in. for color and weathering tests to determine efflorescence potential. Half of the samples were sand-blasted with steel spherical grit to produce a rough surface defined here as mediablast (MB). Furthermore, half of the smooth (SM) and mediablast samples were treated with a silane based penetrating anti-graffiti sealer (AG) to control color fading and water spotting.

Color reading and differences ($\Delta E^*_{ab}$) were measured according to CIE 1976 CIELAB opponent-color space (L, a* and b* scales) perception according to ASTM D2244 definition and methods. L refers to how dark (−100) or how white (100) the illumination of the color is. The value a* refers to how red (+a*) or how green (−a*) the color of the samples displays. Finally, b* refer to how yellow (+b*) or blue (−b*) the tone of the sample is. A Datacolor 45G spectrometer was used to measure color values with a 10° observer and with standard illuminant D65.

Accelerated weathering tests were performed according to the ASTM G155 standard. A Xenon Arc Light Q-Sun weathering chamber was used to expose the samples to wet and dry cycles for 1000 hours. In parallel, normal weathering tests were performed exposing the samples to the environment for a period of one year mounted on a wall located in Turtle Creek, Pa.

The results of the accelerated weathering test are shown in Table 7. As can be seen in this Table, composite UHPC panels of the present invention display substantial improvement in color change and efflorescence potential. For example, Mix B (white cement porcelain sand) has a $\Delta E^*_{ab}$ of 13.49 for the smooth finish without any silane sealer application compared to Ref-1 with 15.24. The improvement is more evident on SM coated and media blast (MB) surface finished panels. In this case, the $\Delta E^*_{ab}$ decreased at least 43 to 53%. The improvement seems to be better with the Gray cement porcelain sand based panels as MB-AG panels darken ($\Delta E^*_{ab}$=−0.21) rather than lighten when compared with Ref-1.

TABLE 7

Accelerated weathering (1000-h) of composite UHPC panels

| UHPC Mixes | color change ($\Delta E^*_{ab}$) | | | |
|---|---|---|---|---|
| | SM | SM-AG | MB | MB-AG |
| Ref-1 | 15.24 | 7.12 | 18.29 | 4.23 |
| Mix B | 13.49 | 3.78 | 7.82 | 0.93 |
| Mix C | 16.90 | 2.08 | 3.12 | −0.21 |

$\Delta E^*_{ab} = [(L_2 - L_1)^2 + (a^*_2 - a^*_1)^2 + (b^*_2 - b^*_1)^2]^{1/2}$ Like the accelerated weathering test, the exposure for one year (365-d) on a natural environment or weathering wall shows lower $\Delta E^*_{ab}$ values for the concretes of the present invention as illustrated in Table 8. This table also shows that composite UHPC porcelain-based UHPC panels possess lower efflorescence potential and better weatherability than concrete with higher cement content (Ref-1) and the use of coarse Nepheline-Syenite sand. In general, any color change ($\Delta E^*_{ab}$) lower than 2 is imperceptible for the naked eye. Color differences with values between 2.0 and 3.5 are perceptible for people with trained eyes. This means, that the surfaces of panels made with porcelain-based UHPC in general are less affected by weather and more consistent in color.

TABLE 8

Natural weathering (365-d) of composite UHPC panels

| UHPC Mixes | color change ($\Delta E^*_{ab}$) | | | |
|---|---|---|---|---|
| | SM | SM-AG | MB | MB-AG |
| Ref-1 | 6.01 | −0.93 | 3.36 | −1.74 |
| Mix B | 3.20 | 1.90 | −1.50 | −2.10 |
| Mix C | 3.36 | 3.05 | −1.50 | −2.02 |

$\Delta E^*_{ab} = [(L_2 - L_1)^2 + (a^*_2 - a^*_1)^2 + (b^*_2 - b^*_1)^2]^{1/2}$ The better weatherability performance is the result of improved particle packing, efficient use of less cement and the higher hydration degree of the porcelain sand based UHPC mixes. The internal curing effects of porcelain particles together with better bonding between the aggregates (denser ITZ) leads to a less permeable pore structure that avoids the intake of surface water. As less water is available to go into the pores to dissolve $Ca(OH)_2$ and leach it to the surface, the efflorescence is decreased.

Example 3

Small samples (122 g) of fresh UHPC from Example 2 (Ref-1, Mix B and Mix C) were taken and cast in small 150 ml PE containers with lids for Isothermal calorimetry Analysis. A Calimetrix HP2000 calorimeter was used. The samples were allowed to hydrate for a period of 72 hours at an isothermal temperature of 20° C. This test measures the heat flow and the cumulative heat of hydration of the UHPC samples. FIG. 3 displays the resultant heat flow curves at 48-h. The intensity of maximum peaks observed is related to the potential maximum heat generated during the hardening process of the concrete. Similarly, FIG. 4 shows the cumulative heat (extrapolated to 14-d) which is proportional to the degree of hydration and to the compressive strength evolution. For example, FIG. 3 illustrates that Mix-B showed similar heat flow even though this mix contains a relatively lower amount of cement and higher water demand. This is caused by the optimum particle packing of the system that requires less cement because the cement particles can be used more efficiently as a binder rather than as a filler, and as a consequence, a more efficient cement hydration process is achieved. Also, Mix C shows a longer hardening time and less intense peaks, produced as a consequence of a lower temperature during setting. This implies that less of a tendency for shrinkage cracking would be expected.

From FIG. 4 it is evident that concretes of the present invention developed higher cumulative heat. As mentioned before, this cumulative heat is proportional to the degree of hydration of the concrete. A higher degree of hydration at the same age would imply higher mechanical properties which was illustrated in Example 1. Again, this example shows that the concrete of the present invention displays an enhanced hydration process due to the synergistic effect of optimum packing, internal curing and better ITZ due to surface pozzolanic reaction of porcelain sand and the white cement and gray oil-well cement binders.

Example 4

Ref-1 and Mix D from Example 1 of the embodiment were cast in 0.5 in. thick (14×26 in.) urethane smooth molds to obtain panels reinforced with two layers of AR-glass mesh with 10×8 yarn count; and with a minimum tensile strength of 4600N/5 cm in warp and 3600N/5 cm in weft direction, respectively. The composite UHPC panels were covered with a plastic sheet and cured in the molds for two days. Afterwards, the panels were demolded and cured in a moist room (80 F, RH80%) for a minimum of 16 days. Once cured, the panels were removed from the curing room and processed to produce small size panels 12×4.5 in. extracted in both the warp and weft direction of the mesh weaving configuration. The resultant samples were tested in three bending tests according to ASTM C1185 standard. A span of 254 mm (10 in.) was used between the supporting rolls in bending configuration.

The results of the bending test for Ref-1 and Mix D are summarized in Table 9. Additionally, the bending stress vs. deflection of panels are displayed in FIGS. 5 and 6.

TABLE 9

Three bending test results for composite UHPC panels (12 × 4.5 × 0.5 in.)

| UHPC Mixes/ Prop. | First Crack (MPa) | First Crack deflection (mm) | M.O.R. (MPa) | Deflection at failure (mm) |
|---|---|---|---|---|
| Ref-1 | 14.79 ± 1.76 | 0.41 ± 0.05 | 41.91 ± 2.75 | 10.93 ± 0.01 |
| Mix D | 15.63 ± 0.89 | 0.48 ± 0.06 | 41.12 ± 2.91 | 11.92 ± 1.32 |

Table 9 shows that Mix-D possesses a higher first crack stress which indicates a better resistance to cracking or hair line cracking in the panels. For example, Ref-1 has a first crack bending stress of 14.8 MPa compared to the Mix D designed with porcelain sand that has a first crack bending stress of 15.6 MPa. Similarly, the deflection at the initiation of the first crack is higher on the Mix-D sample. Both samples presented the same modulus of rupture (M.O.R.), i.e. 41-42 MPa in maximum bending stress. The main difference at maximum bending stress is the deflection obtained at this point. The Mix D displayed, in general, higher deflection values, which is indicative of an improved ductility. Additionally, the shape of the curves obtained with the Mix D is smoother than the Ref-1. A smoother curve means that less or smaller multiple cracks are formed during the deflection process probably resulting from higher bonding strength between the AR-glass mesh and improved UHPC matrix. This leads to an efficient transfer of the stress to the mesh, effectively utilizing the reinforcing effects of the glass mesh (increased toughness). These results demonstrated that the composite UHPC of the present innovation possess extended deflections and improved ductility.

The invention claimed is:

1. A method for manufacturing a composite architectural porcelain base panel, comprising the steps of:
   spreading concrete into a urethane resin mold to form a first concrete layer, wherein the concrete comprises cement in an amount between 500 and 680 kg/m$^3$ and porcelain sand in an amount between 500 and 1200 kg/m$^3$;
   setting an AR-glass mesh on the first concrete layer;
   spreading a second concrete layer on top of the AR-glass mesh;
   setting a second AR-glass mesh on the second concrete layer; and
   spreading a third concrete layer over the second AR-glass mesh to form a composite panel.

2. The method of claim 1, wherein the composite panel is covered with a plastic sheet to avoid evaporation, and cured for at least 48 hours inside the mold.

3. The method of claim 2, wherein, after curing inside the mold, the panel is stripped from the urethane mold and further cured in a moist room 80° F. HR 80% for a period of 14-21 days.

4. The method of claim 3, wherein the composite panel, after secondary curing is treated with penetrating hydrophobic sealers to impart water beading, anti-graffiti and color control effects to a surface of the panel when exposed to environment and vandalism.

5. The method of claim 4, wherein the penetrating sealer comprises waterborne silanes, flour-silanes, alkoxy-silanes and mixtures thereof.

6. The method of claim 3, wherein the composite panel, after secondary curing is stained with waterborne solid color coating.

7. The method of claim 6, wherein the solid color coating constitutes water based emulsions of acrylic, vinyl acetate/versatate, styrene acrylic copolymers and/or a mixture thereof.

8. The method of claim 6, wherein the solid color coating is pigmented or un-pigmented.

9. The method of claim 6, wherein the solid color coating has a solid content of 22 to 50% wt and a volatile organic content (VOC) lower than 224 g/l.

10. The method of claim 1, wherein the first concrete layer has a thickness of 4 to 7 mm.

11. The method of claim 1, wherein the second concrete layer has a thickness of 7 to 9 mm.

12. The method of claim 1, wherein the third concrete layer has a thickness of 1 to 4 mm.

13. The method of claim 1, wherein the resultant composite panel comprises two to three AR-glass mesh layers.

14. The method of claim 13, wherein the AR-glass mesh comprises woven yarn of 1200 Tex (g/Km) made of alkaline resistance glass.

15. The method of claim 14, wherein the yarn is manufactured of a glass with zirconia ($ZrO_2$) content greater than 16% wt.

16. The method of claim 14, wherein the woven yarn has a tensile strength in warp and weft direction of 2900 N/5 cm to 6000 N/5 cm.

17. The method of claim 1, wherein the composite panel has a flexural first crack value of 10 to 20 MPa when testing in a three bending test.

18. The method of claim 1, wherein the composite panel has an ultimate module of rupture, determined by three bending test of 22 to 60 MPa.

19. The method of claim 1, wherein the concrete is used to manufacture a shape form by gravity casting, pressure casting or a combination thereof.

20. The method of claim 19, wherein the shape form comprises corners, fin, decorative screens, architectural elements and combinations thereof.

21. The method of claim 1, wherein the first concrete layer, the second concrete layer and the third concrete layer are spread with the same concrete.

* * * * *